United States Patent
Schipper et al.

(10) Patent No.: US 12,227,697 B2
(45) Date of Patent: Feb. 18, 2025

(54) METHODS FOR DELAYING IN SITU ACID GENERATION FOR ACID DELIVERY TO A SITE

(71) Applicant: Saudi Arabian Oil Company, Dhahran (SA)

(72) Inventors: Desmond E. Schipper, Houston, TX (US); Amy J. Cairns, Houston, TX (US); Katherine L. Hull, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/394,547

(22) Filed: Aug. 5, 2021

(65) Prior Publication Data

US 2022/0041922 A1    Feb. 10, 2022

Related U.S. Application Data

(60) Provisional application No. 63/061,840, filed on Aug. 6, 2020.

(51) Int. Cl.
| | | |
|---|---|---|
| *E21B 43/27* | (2006.01) | |
| *C09K 8/60* | (2006.01) | |
| *C09K 8/70* | (2006.01) | |
| *C09K 8/72* | (2006.01) | |

(52) U.S. Cl.
CPC .............. *C09K 8/72* (2013.01); *C09K 8/602* (2013.01); *C09K 8/706* (2013.01); *E21B 43/27* (2020.05)

(58) Field of Classification Search
CPC .......... C09K 8/72; C09K 8/602; C09K 8/706; E21B 43/27
See application file for complete search history.

(56) References Cited

U.S. PATENT DOCUMENTS

| | | |
|---|---|---|
| 3,828,854 A | 8/1974 | Templeton et al. |
| 3,868,998 A | 3/1975 | Lybarger et al. |
| 3,948,324 A | 4/1976 | Lybarger |
| 4,232,741 A | 11/1980 | Richardson et al. |
| 4,324,669 A | 4/1982 | Norman et al. |
| 4,368,136 A | 1/1983 | Murphey |
| 4,502,540 A | 3/1985 | Byham |
| 4,737,296 A | 4/1988 | Watkins |
| 5,964,295 A | 10/1999 | Brown et al. |
| 6,207,620 B1 | 3/2001 | Gonzalez et al. |
| 6,431,279 B1 | 8/2002 | Zaid et al. |
| 7,166,560 B2 | 1/2007 | Still et al. |
| 7,753,123 B2 | 7/2010 | Fuller |
| 7,947,629 B2 | 5/2011 | Fuller |
| 9,512,350 B2 | 12/2016 | Vo |
| 9,725,643 B2 | 8/2017 | De Wolf et al. |
| 9,902,898 B2 * | 2/2018 | Nelson ................... E21B 43/267 |
| 10,030,471 B2 * | 7/2018 | Lecerf ....................... E21B 43/26 |
| 10,138,415 B2 * | 11/2018 | Bryant ................... C09K 8/516 |
| 10,895,140 B2 | 1/2021 | Cairns et al. |
| 11,156,070 B2 | 10/2021 | Sayed et al. |
| 2004/0009880 A1 | 1/2004 | Fu |
| 2008/0017382 A1 | 1/2008 | Harris et al. |
| 2008/0139412 A1 | 6/2008 | Fuller |
| 2009/0025933 A1 | 1/2009 | Garcia-Lopez de Victoria et al. |
| 2009/0042750 A1 | 2/2009 | Pauls et al. |
| 2009/0131285 A1 | 5/2009 | Wang et al. |
| 2009/0281005 A1 | 11/2009 | Qu et al. |
| 2009/0286701 A1 | 11/2009 | Davidson |
| 2014/0296113 A1 | 10/2014 | Reyes et al. |
| 2015/0075797 A1 | 3/2015 | Jiang et al. |
| 2015/0080271 A1 | 3/2015 | De Wolf et al. |
| 2016/0244659 A1 * | 8/2016 | Shahin ................... E21B 43/16 |
| 2016/0298024 A1 | 10/2016 | Panga et al. |
| 2017/0081584 A1 | 3/2017 | Shahin et al. |
| 2018/0291720 A1 * | 10/2018 | Cairns ..................... C09K 8/845 |
| 2019/0010385 A1 | 1/2019 | Sayed et al. |
| 2020/0116001 A1 | 4/2020 | Sayed et al. |
| 2021/0032530 A1 * | 2/2021 | Nguyen .................. E21B 43/27 |
| 2022/0041921 A1 | 2/2022 | Cairns et al. |

FOREIGN PATENT DOCUMENTS

| | | |
|---|---|---|
| CN | 102399550 A | 4/2012 |
| CN | 102899012 A | 1/2013 |
| CN | 105950129 A | 9/2016 |
| EP | 0 181 210 A2 | 5/1986 |
| WO | WO-94/25731 A1 | 11/1994 |
| WO | WO-2004/007905 A1 | 1/2004 |
| WO | WO-2013/189842 A1 | 12/2013 |
| WO | WO-2014/099667 A1 | 6/2014 |
| WO | WO-2015/030801 A1 | 3/2015 |
| WO | WO-2015/038153 A1 | 3/2015 |
| WO | WO-2015/154977 A1 | 10/2015 |
| WO | WO-2015/187178 A1 | 12/2015 |
| WO | WO-2016/018374 A1 | 2/2016 |
| WO | WO-2016/043703 A1 | 3/2016 |

(Continued)

OTHER PUBLICATIONS

Blaskó, C. et al., Oxidations of Organic Sulfides in Aqueous Sulfobetaine Micelles, Jrnl. Coll. Inter. Sci., 175(1):122-130 (1995).
International Search Report for PCT/IB2021/057219, 4 pages (mailed Nov. 29, 2021).
International Search Report for PCT/IB2021/057221, 5 pages (mailed Dec. 9, 2021).
Written Opinion for PCT/IB2021/057219, 7 pages (mailed Nov. 29, 2021).
Written Opinion for PCT/IB2021/057221, 9 pages (mailed Dec. 9, 2021).
Hull, K. L. et al., Bromate Oxidation of Ammonium Salts: In Situ Acid Formation for Reservoir Stimulation, Inorg. Chem., 58:3007-3014 (2019).
International Search Report for PCT/US2018/026247, 4 pages (mailed Jun. 19, 2018).
International Search Report for PCT/US2018/038937, 4 pages (mailed Oct. 8, 2018).
International Search Report for PCT/US2019/055456, 5 pages (mailed Dec. 16, 2019).

(Continued)

*Primary Examiner* — Silvana C Runyan
(74) *Attorney, Agent, or Firm* — Osha Bergman Watanabe & Burton LLP

(57) ABSTRACT

Provided herein are methods and compositions for delayed in-situ generation of acids.

17 Claims, No Drawings

(56) References Cited

FOREIGN PATENT DOCUMENTS

| WO | WO-2016/108877 A1 | 7/2016 |
| WO | WO-2016/180664 A1 | 11/2016 |
| WO | WO-2018/187565 A1 | 10/2018 |
| WO | WO-2018/237237 A1 | 12/2018 |
| WO | WO-2020/076993 A1 | 4/2020 |
| WO | WO-2022/029690 A1 | 2/2022 |
| WO | WO-2022/029692 A1 | 2/2022 |

OTHER PUBLICATIONS

Kankaria, S. et al., Matrix Acidizing of Carbonate Rocks Using New Mixtures of HCl/Methanesulfonic Acid. Prepared to be Presented at the SPE International Conference on Oilfield Chemistry held in Montgomery, Texas, USA, SPE-184528-MS (Apr. 3-5, 2017).

Le Page, J.N. et al., An Environmentally Friendly Stimulation Fluid for High Temperature Applications. Presented at the SPE International Symposium on Oilfield Chemistry held in The Woodlands, Texas, USA, SPE-121709-MS (Apr. 20-22, 2009).

Mahmoud, M.A. et al., Stimulation of Carbonate Reservoirs Using GLDA (Chelating Agent) Solutions. Presented at the SPE Trinidad and Tobago Energy/Resources Conference held in Port of Spain, Trinidad, SPE-132286-MS (Jun. 27-30, 2010).

Rabie, A.I. et al., Reaction of GLDA with Calcite: Reaction Kinetics and Transport Study. Presented at the SPE International Symposium on Oilfield Chemistry held in The Woodlands, Texas, USA, SPE-139816-MS (Apr. 11-13, 2011).

Reyath, S.N. et al., Determination of the Diffusion Coefficient of Methanesulfonic Acid Solutions with Calcite Using the Rotating Disk Apparatus. Presented at the SPE International Symposium on the Oilfield Chemistry held in The Woodlands, Texas, USA, SPE-173794-MS (Apr. 13-15, 2015).

Sayed, M and Cairns, A.J., A Low-Viscosity Retarded Acid System for Stimulation of High-Temperature Deep Wells, Offshore Technology Confrence, Houston, Texas, USA, OTC-28838-MA, 20 pages (Apr. 30-May 3, 2018).

Written Opinion for PCT/US2018/026247, 7 pages (mailed Jun. 19, 2018).

Written Opinion for PCT/US2018/038937, 7 pages (mailed Oct. 8, 2018).

Written Opinion for PCT/US2019/055456, 9 pages (mailed Dec. 16, 2019).

* cited by examiner

METHODS FOR DELAYING IN SITU ACID GENERATION FOR ACID DELIVERY TO A SITE

CROSS REFERENCE TO RELATED APPLICATIONS

This application claims priority to and the benefit of U.S. Provisional Patent Application Ser. No. 63/061,840, filed Aug. 6, 2020, entitled "METHODS FOR DELAYING IN-SITU ACID GENERATION," the disclosure of which is incorporated herein by reference in its entirety.

BACKGROUND

In the oil and gas industry, rock formations such as carbonate and sandstone formations are commonly stimulated (i.e., acidized) in order to improve the production from an oil or gas well or water injector or disposal well. These carbonate and sandstone formations have differing levels of reactivity depending on the composition of the formation and the properties of the acid used in the treatment. Failure to stimulate a formation or otherwise remove wellbore damage from deep within an oil or gas well and/or in the vicinity of a near-wellbore region can result in premature abandonment of a well, or otherwise inefficient extraction of particular oil or gas materials.

SUMMARY

The present disclosure provides, among other things, methods and compositions for use in, for example, the oil and gas industry, for the delivery of acids to site specific locations at certain times. For example, the present disclosure provides, in some aspects, a method for delivering an acid to a site, the method comprising steps of contacting the site with one or more aqueous fluids comprising an ammonium salt, an oxidizing agent, and a surfactant, characterized in that the acid is generated at the site at a rate that is less than the rate of acid generation when the surfactant is absent.

In some embodiments, the present disclosure provides, in a method of generating acid at a site comprising contacting the site with one or more aqueous fluids comprising an ammonium salt and an oxidizing agent, the improvement that comprises contacting the site with one or more aqueous fluids comprising a surfactant.

DEFINITIONS

Throughout the specification, several terms are employed that are defined in the following paragraphs. Other definitions may also be found within the body of the specification.

About, Approximately: As used in the present disclosure, the terms "about" and "approximately," in reference to a number, are used to include numbers that fall within a range of 20%, 10%, 5%, 1%, or 0.5% in either direction of (greater than or less than, or ± each indicated number, for example, "about 20%" can refer to ±20% of an indicated value) the number unless otherwise stated or otherwise evident from the context (except where such number would exceed 100% of a possible value).

Aliphatic: As used in the present disclosure, the term "aliphatic" means a straight-chain (i.e., unbranched) or branched, substituted or unsubstituted hydrocarbon chain that is completely saturated or that contains one or more units of unsaturation, or a monocyclic hydrocarbon or bicyclic hydrocarbon that is completely saturated or that contains one or more units of unsaturation, but which is not aromatic (also referred to herein as "carbocycle," "carbocyclic", "cycloaliphatic" or "cycloalkyl"), that has a single point of attachment to the rest of the molecule. Unless otherwise specified, aliphatic groups contain 1-20 aliphatic carbon atoms. In some embodiments, aliphatic groups contain 1-12 aliphatic carbon atoms. In some embodiments, aliphatic groups contain 1-8 aliphatic carbon atoms. In some embodiments, aliphatic groups contain 1-6 aliphatic carbon atoms. In some embodiments, aliphatic groups contain 1-5 aliphatic carbon atoms. In other embodiments, aliphatic groups contain 1-4 aliphatic carbon atoms. In still other embodiments, aliphatic groups contain 1-3 aliphatic carbon atoms, and in yet other embodiments, aliphatic groups contain 1-2 aliphatic carbon atoms. In some embodiments, "carbocyclic" (or "cycloaliphatic" or "carbocycle" or "cycloalkyl") refers to a monocyclic $C_3$-$C_8$ hydrocarbon that is completely saturated or that contains one or more units of unsaturation, but which is not aromatic, that has a single point of attachment to the rest of the molecule. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl. In some embodiments, "heteroaliphatic" refers to an aliphatic group or chain comprising one or more heteroatoms, wherein the term "heteroatom" means one or more of oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring, for example N (as in 3,4-dihydro-2H-pyrrolyl), NH (as in pyrrolidinyl) or $NR^+$ (as in N-substituted pyrrolidinyl)).

Alkyl: As used in the present disclosure, the term "alkyl" refers to a fully saturated aliphatic group, for example, an aliphatic group containing no double or triple bonds. Suitable alkenyl groups include, but are not limited to, methyl, ethyl, n-propyl, n-butyl, and the like.

Alkenyl: As used in the present disclosure, the term "alkenyl" refers to an aliphatic group containing at least one double bond. Suitable alkenyl groups include, but are not limited to, ethenyl, n-propenyl, n-butenyl, and the like.

Alkynyl: As used in the present disclosure, the term "alkynyl" refers to an aliphatic group containing at least one triple bond. Suitable alkenyl groups include, but are not limited to, ethynyl, n-propynyl, n-butynyl, and the like.

Aryl: As used in the present disclosure, the term "aryl," used alone or as part of a larger moiety as in "aralkyl," "aralkoxy," or "aryloxyalkyl," refers to monocyclic or bicyclic ring systems having a total of five to fourteen ring members, wherein at least one ring in the system is aromatic and wherein each ring in the system contains 3 to 7 ring members. The term "aryl" may be used interchangeably with the term "aryl ring." In certain embodiments of the present invention, "aryl" refers to an aromatic ring system and exemplary groups include phenyl, biphenyl, naphthyl, anthracyl and the like, which may bear one or more substituents. Also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like.

Downhole equipment: As used in the present disclosure, the term "downhole equipment" refers to devices used to measure conditions inside an oil well. For example, in some embodiments, downhole equipment includes a pressure sensor for measuring pressure inside an oil well. In some embodiments, downhole equipment includes a temperature sensor for measuring temperature inside an oil well. In some embodiments, downhole equipment includes a pressure sensor and a temperature sensor. As used in the present disclosure, the term "oil well" means a boring (for example, a drilled hole or tunnel) in the earth that is designed to bring hydrocarbons (for example, oil) from an underground hydrocarbon reservoir to the surface.

In situ acid generation: As used in the present disclosure, the term "in situ acid generation" refers generally to the generation of acid "in one pot" where a reaction is intended to take place, as opposed to generating acid in one vessel and transferring it to a separate vessel for reaction. In some embodiments, in situ generation of acid comprises generating acid at a desired location where the acid is intended to react, for instance by generating acid in a subterranean reservoir downhole, as opposed to generating acid on the earth's surface and transferring it to a subterranean reservoir downhole.

DETAILED DESCRIPTION

In the oil and gas industry, stimulation (i.e., acidization) of rock formations, e.g., sandstone or carbonate formations, comprising a hydrocarbon-containing reservoir is critical for the production of oil and gas. Stimulation is intended to enhance permeability in the reservoir, thereby improving flow of hydrocarbons from the reservoir into the wellbore. Failure to stimulate these rock formations can lead to premature abandonment of a well, where precious resources may never be retrieved.

The present disclosure provides methods and compositions useful for stimulating rock formations (e.g., deep in the formation) and for clean-up in the vicinity of the near-wellbore region. For instance, the term clean-up, as used in the present disclosure, refers to removal of acid-dissolvable material that may accumulate in the near-wellbore region over the course of the drilling process; in some embodiments, use of the methods and compositions described in the present disclosure for wellbore clean-up improves the "skin factor," where a positive skin effect indicates additional flow resistance near the wellbore region and a negative skin effect indicates enhancement of flow near the wellbore region. In some embodiments, the present disclosure provides, among other things a method of selectively delivering an acid to a site, e.g., a site within a rock formation, the method comprising steps of contacting the site with one or more aqueous fluids comprising an ammonium salt, an oxidizing agent, and a surfactant, characterized in that the acid is generated at the site at a rate that is less than the rate of acid generation when the surfactant is absent. In some embodiments, a rock formation contains a hydrocarbon reservoir. In some embodiments, a rock formation comprises carbonate. In some embodiments, a rock formation comprises sandstone. In some embodiments, a rock formation comprises clastic sedimentary rock. For instance, in some embodiments, a rock formation comprises shale. Methods provided herein overcome certain problems associated with previous methods of rock (e.g., sandstone and carbonate) formation stimulation, which suffer from inefficient acid placement in the targeted zone, corrosion to metal tubulars, reduced reactivity or other inefficiencies due, at least in part, to fast reaction kinetics of the acid.

For example, previous methods of carbonate and sandstone stimulation generally rely on the use of mineral acids, such as hydrochloric acid (HCl), hydrofluoric acid (HF), and mud acid systems, which can include a mixture of HCl and HF, or $HBF_4$-based systems. HCl is useful because it reacts with the minerals in carbonate formations, and is generally cost efficient. HF is useful in sandstone formations for the dissolution of formation minerals such as clay and other siliceous deposits. However, HCl and/or HF acid systems are corrosive and can create dangerous handling and operating conditions. Additionally, use of HF poses concerns for side-reactions that may lead to unwanted precipitation thereby creating formation damage as a treatment fluid penetrates further from a near wellbore area. Further, in many instances, reaction of HCl with the rock face of the formation is rapid, frequently instantaneous, which limits the penetration depth of acid as it becomes prematurely spent before reaching the target zone. Others have explored the use of alternative acid systems to HCl, including but not limited to organic or synthetic acids, gelled acids, emulsified acids, hydrolysable esters, or acid-producing precursors and enzymes. Each of these proposed solutions, however, have certain limitations such as cumbersome mixing procedures, low dissolving power, high-friction pressures, formation damage/precipitation, and high cost.

The present disclosure overcomes some of the challenges associated with traditional methods by providing methods and compositions that allow for controlled stimulation of a rock formation via in situ acid generation which offers two primary benefits to the operation, namely, on-demand acid generation/placement in the zone of interest and use of reagents that are non-reactive to the metal tubulars thereby potentially eliminating the need for costly corrosion inhibitors, some of which may lead to formation damage. The in situ acid generation method also means that acid, particularly hazardous HF, will not be handled by operators at the surface. For example, in some aspects, provided methods and compositions delay generation of acid or otherwise delay release of acid until it is in contact with or otherwise within a reasonable proximity of a targeted site in a rock-based formation. Moreover, present methods and compositions can be used at increased temperatures and pressures found deep within wellbores, and in some embodiments do not become reactive until reported compositions are exposed to said increased temperatures and pressures.

Acid Generation

In some aspects, the present disclosure provides a method for controlling delivery of an acid to a site, for example, rock-based formation such as a carbonate or sandstone formation. In some embodiments, a rock-based formation is a carbonate formation comprising calcite, dolomite, or combinations thereof. Provided methods control delivery by one or more means, including, for example, delaying activation of acid temporarily (e.g., once components are mixed together, an induction period is required before acid is generated) or otherwise encapsulating or emulsifying certain components of acid precursor(s) such that an encapsulated component will not contact other precursors until exposed to certain conditions, e.g., certain temperatures, pressures and/or accelerating agents.

In some embodiments, the present disclosure encompasses the insight that a wide range of inorganic and organic acids can be generated via a redox chemistry approach, by using certain oxidizing agents to oxidize ammonium-based salts, and that said the redox reaction can be selectively delayed through use of a surfactant described herein. Use of a surfactant allows a reduction of rate of acid generation as compared to rate of acid generation absent a surfactant. In some embodiments, the present disclosure provides a method of selectively delivering an acid to a site, e.g., a site within a rock-based formation, the method comprising steps of contacting the site with one or more aqueous fluids comprising an ammonium salt, an oxidizing agent, and a surfactant, characterized in that the acid is generated at the site at a rate that is less than the rate of acid generation when the surfactant is absent.

As described generally herein, in some embodiments, an acid is generated according to described methods at a temperature of about 65° C. or greater. In some embodiments, an acid is not generated at a temperature below about 65° C. In some embodiments, an acid is generated at a pressure greater than 1 atmosphere ("atm"). In some embodiments, an acid is not generated at a pressure less than 1 atmosphere.

A rate of reaction (e.g., the generation) of an acid can also be controlled by varying an amount of surfactant in the one or more aqueous fluids. For example, in some embodiments, a molar ratio of the surfactant to an oxidizing agent is 1:1 or less. In some embodiments, an amount of surfactant is present in an amount that is sub-stoichiometric relative to an oxidizing agent. In some embodiments, a molar ratio of surfactant to an oxidizing agent is 1:10 or less. In some embodiments, a molar ratio of surfactant to an oxidizing agent is 1:50 or less. In some embodiments, a molar ratio of surfactant to an oxidizing agent is 1:100 or less.

In some embodiments, each of an ammonium salt, an oxidizing agent, and a surfactant are within one aqueous fluid. In some embodiments, each of an ammonium salt, an oxidizing agent, and a surfactant are within separate aqueous fluids. In some embodiments, each of an ammonium salt, an oxidizing agent, and a surfactant are within a combination of one or more aqueous fluids. For example, in some embodiments, methods described herein provide for separate delivery of each of an ammonium salt, an oxidizing agent, and a surfactant via separate aqueous fluids. In some embodiments, an aqueous fluid can have a combination of an ammonium salt, an oxidizing agent, and a surfactant, and another aqueous fluid can have the remainder of an ammonium salt, an oxidizing agent, and a surfactant (e.g., one aqueous fluid can comprise an ammonium salt and an oxidizing agent, whereas a separate aqueous fluid can comprise a surfactant, or, one aqueous fluid can comprise an ammonium salt and a surfactant, whereas a separate aqueous fluid can comprise an oxidizing agent).

In some embodiments, aqueous fluids are delivered to a site simultaneously. In some embodiments, aqueous fluids are delivered separately. In some embodiments, aqueous fluids are delivered sequentially, with a temporal delay between each aqueous fluid delivered to the site. In some embodiments, a surfactant is delivered to a formation first. In some embodiments, a surfactant and ammonium salt are delivered to a formation first. In some embodiments, an oxidizer is delivered to a formation first.

In some embodiments, an induction time for acid generation is increased as compared to induction time absent a surfactant (i.e., acid is generated at a site at a rate that is less than the rate of acid generation when a surfactant is absent). In some embodiments, an induction time for acid generation is increased as compared to induction time absent a surfactant (i.e., acid is generated at a site at a rate that is less than the rate of acid generation when a surfactant is absent). In some embodiments, induction time is increased by 20 minutes or more. In some embodiments, induction time is increased by 30 minutes or more. In some embodiments, induction time is increased by 45 minutes or more. In some embodiments, induction time is increased by one hour or more.

In some embodiments, an oxidizing agent also reacts with organic matter in an unconventional formation in order to degrade the organic matter. As described herein, an "unconventional formation" is a rock formation which contains organic matter (e.g., kerogen, bitumen, pyrobitumen) as the hydrocarbon source dispersed throughout the formation. A conventional formation, in contrast, concentrates hydrocarbons in a trap zone. An unconventional formation exhibits low permeability and, in some embodiments, is hydraulically fractured to create channels for hydrocarbon flow into the wellbore. In some embodiments, an oxidizing agent is pumped before an ammonium salt and a portion of the oxidizing agent reacts with organic matter. In some embodiments, a surfactant is pumped before an oxidizing agent. In some embodiments, a surfactant is pumped with an oxidizing agent. In some embodiments, a surfactant is pumped with an ammonium salt.

In some embodiments, an oxidizing agent and ammonium salt are pumped together and react with each other before or as excess oxidizing agent reacts with organic matter (i.e. kerogen, bitumen, pyrobitumen) in a formation. In some embodiments, a surfactant is pumped before an oxidizing agent and ammonium salt. In some embodiments, a surfactant is pumped with an oxidizing agent and ammonium salt.

In some embodiments, induction time increase is measured relative to a reference induction time; for example, an induction time increase is measured relative to reaction of ammonium chloride and sodium bromate in a two to one (2:1) ratio, respectively under analogous test conditions absent any accelerating or de-accelerating agents. For example, in some embodiments, induction time is increased by a factor of 4 or more (i.e., induction time is 4× or more longer than induction time in the absence of a surfactant; that is, reaction rate of acid generation is reduced by a factor of 4 or more than reaction rate in the absence of a surfactant). In some embodiments, induction time is increased by a factor of 6 or more. In some embodiments, induction time is increased by a factor of 9 or more. In some embodiments, induction time is increased by a factor of 12 or more. In some embodiments, induction time is increased by a factor of 15 or more. In some embodiments, the reference induction time is four minutes or less. In some embodiments, the reference induction time is four minutes.

In some embodiments, one or more aqueous fluids are delivered to a site (e.g., a site within a well) via coiled tubing or bullheading in a production tube. In some embodiments, an aqueous fluid comprising an ammonium salt, an aqueous fluid comprising a surfactant, and an aqueous fluid comprising an oxidizing agent is delivered to a site via the same tubing (for example, the same coiled tubing) and allowing an aqueous fluid to form an acid in situ within the tubing, within a formation, or within the area around a wellbore.

In some embodiments, each aqueous fluid (e.g., an aqueous fluid comprising an ammonium salt, an aqueous fluid comprising a surfactant, and an aqueous fluid comprising an oxidizing agent) is delivered to the site via separate tubing, thereby allowing acid to generate in situ within a rock formation. In some embodiments, an aqueous fluid comprising an ammonium salt is introduced into a formation first. In some embodiments, an aqueous fluid comprising an oxidizing agent is introduced into a rock formation first.

Ammonium Salts

Ammonium salts described herein are sources of hydrogen ions useful for preparing acids described herein. In some embodiments, an ammonium salt comprises an ammonium halide. In some embodiments, an ammonium halide comprises ammonium fluoride, ammonium chloride, ammonium bromide, ammonium iodide, and mixtures thereof. In some embodiments, an ammonium salt comprises ammonium fluoride. In some embodiments, an ammonium salt comprises ammonium hydrogen difluoride. In some embodiments, an ammonium salt comprises ammonium chloride.

In some embodiments, an ammonium salt comprises an anion that is also an oxidizing agent. For instance, in some embodiments, an ammonium salt comprises ammonium persulfate.

In some embodiments, an ammonium salt comprises a polyatomic anion such as sulfate, hydrogen sulfate, thiosulfate, nitrite, nitrate, phosphite, phosphate, monohydrogen phosphate, dihydrogen phosphate, carbonate, and combinations thereof. Other such polyatomic anions are known to those of skill in the chemical arts. For example, as described in Wade, L. G. Jr. (2005) Organic Chemistry (6$^{th}$ Edition) Prentice Hall.

In some embodiments, an ammonium salt comprises an oxidation-resistant anion. A person of skilled in the art would understand what ammonium salts are useful or desired for reaction with a particular oxidizing agent depending on the strength of the acid desired.

In some embodiments, an ammonium salt is an N-substituted ammonium salt. In some embodiments, an N-substituted ammonium salt is mono-substituted or di-substituted, for instance with one or two alkyl groups. In some such embodiments, the N-substituted ammonium salt is tri-substituted, for instance with three alkyl groups. Exemplary alkyl groups include methyl, ethyl, propyl, butyl, and the like. In some embodiments, an ammonium salt is not a tri-substituted ammonium salt. In some embodiments, an ammonium salt is not a tetra-substituted ammonium salt.

In some embodiments, an ammonium salt is selected based on an intended application. A person of skill in the art, looking to prepare described compositions, will appreciate that various ammonium salts are suitable for use in delivering certain acids. For instance, where an intended application is stimulation of a carbonate formation, it is, in some embodiments, desirable to deliver a mineral acid, for example hydrochloric acid, to a zone of interest in a delayed fashion. For example, in some embodiments, ammonium chloride is selected as an ammonium salt. In some embodiments where an intended application is stimulation of a sandstone formation, it is desirable to generate hydrofluoric acid. In some embodiments, ammonium fluoride is selected as an ammonium salt. In some embodiments, where prolonged durations of time are needed to generate acid, an ammonium salt having a higher degree of hydrophobicity is used.

In some embodiments, an ammonium salt is present in an aqueous fluid at a concentration in the range of 0.001 M up to saturation as measured at 20° C. In some embodiments, a salt is present in an aqueous fluid at a concentration in a range of 0.1 M to 1.0 M. In some embodiments, a salt is present in an aqueous fluid at a concentration in a range of 0.2 M to 1.0 M. In some embodiments, a salt is present in an aqueous fluid at a concentration in a range of 0.3 M to 1.0 M. In some embodiments, a salt is present in an aqueous fluid at a concentration in a range of 0.4 M to 1.0 M. In some embodiments, a salt is present in an aqueous fluid at a concentration in a range of 0.5 M to 1.0 M. In some embodiments, a salt is present in an aqueous fluid at a concentration in a range of 0.6 M to 1.0 M. In some embodiments, a salt is present in an aqueous fluid at a concentration in a range of 0.7 M to 1.0 M. In some embodiments, a salt is present in an aqueous fluid at a concentration in a range of 0.8 M to 1.0 M. In some embodiments, a salt is present in an aqueous fluid at a concentration in a range of 0.9 M to 1.0 M. In some embodiments, a salt is present in an aqueous fluid at a concentration in a range of 0.2 M to 0.9 M. In some embodiments, a salt is present in an aqueous fluid at a concentration in a range of 0.3 M to 0.8 M. In some embodiments, a salt is present in an aqueous fluid at a concentration in a range of 0.4 M to 0.7 M. In some embodiments, a salt is present in an aqueous fluid at a concentration in a range of 0.5 M to 0.6 M. In some embodiments, a salt is present in an aqueous fluid at a concentration in a range of 0.1 M to 10.0 M. In some embodiments, a salt is present in an aqueous fluid at a concentration in a range of 0.5 M to 10.0 M. In some embodiments, a salt is present in an aqueous fluid at a concentration in a range of 1.0 M to 10.0 M. In some embodiments, a salt is present in an aqueous fluid at a concentration in a range of 1.5 M to 10. M. In some embodiments, a salt is present in an aqueous fluid at a concentration in a range of 2.0 M to 10.0 M. In some embodiments, a salt is present in an aqueous fluid at a concentration in a range of 2.5 M to 9.5 M. In some embodiments, a salt is present in an aqueous fluid at a concentration in a range of 3.0 M to 9.0 M. In some embodiments, a salt is present in an aqueous fluid at a concentration in a range of 3.5 M to 8.5 M. In some embodiments, a salt is present in an aqueous fluid at a concentration in a range of 4.0 M to 8.5 M. In some embodiments, a salt is present in an aqueous fluid at a concentration in a range of 4.5 M to 8.5 M. In some embodiments, a salt is present in an aqueous fluid at a concentration in a range of 5.0 M to 8.5 M. In some embodiments, a salt is present in an aqueous fluid at a concentration in a range of 5.5 M to 8.5 M. In some embodiments, a salt is present in an aqueous fluid at a concentration in a range of 6.0 M to 8.5 M. In some embodiments, a salt is present in an aqueous fluid at a concentration in a range of 6.5 M to 8.5 M. In some embodiments, a salt is present in an aqueous fluid at a concentration in a range of 7.0 M to 8.0 M.

In some embodiments, an ammonium salt can be encapsulated according to known methods. For example, in some embodiments, an ammonium salt is encapsulated by one or more polymers, emulsions, or oils. In some embodiments, an ammonium salt is encapsulated by a polymer. In some embodiments, an ammonium salt is encapsulated by a hydrated polymer. In some embodiments, a hydrated polymer is guar, chitosan, or polyvinyl alcohol. In some embodiments, an ammonium salt is encapsulated by a binder. In some embodiments, a binder is carboxymethyl cellulose or xanthan. It is understood that heat of formation, pressure, shear, presence of acid, or presence of water may each or collectively erode or degrade encapsulation materials provided herein, thereby releasing reactants (i.e., an ammonium salt).

Oxidizing Agents

Oxidizing agents described herein are or comprise an agent for oxidizing an ammonium salt described herein. As described generally herein, in some embodiments, an oxidizing agent is selected from a peroxide, a persulfate salt, a permanganate salt, a bromate salt, a perbromate salt, a hypochlorite salt, a chlorite salt, a chlorate salt, a perchlorate salt, a iodate salt, a periodate salt, and combinations thereof. A person of skill in the art would understand what oxidation agents are useful or desired for reaction with a particular ammonium salt depending on the strength of the acid desired. In some embodiments, an oxidizing agent is an inorganic oxidizing agent. In some embodiments, an oxidizing agent comprises an agent selected from the group consisting of a peroxide, a persulfate salt, a permanganate salt, a bromate salt, a perbromate salt, a hypochlorite salt, a chlorite salt, a chlorate salt, a perchlorate salt, a iodate salt, a periodate salt, and mixtures thereof. In some embodiments, an oxidizing agent is a bromate salt, for example an alkali bromate salt. In some embodiments, an oxidizing agent is or comprises sodium bromate. In some embodiments, an oxidizing agent is an organic oxidizer. In some embodiments, an oxidizing agent comprises an agent selected from the group consisting of organic peroxides, such as hydroperoxides, peroxy acids and esters, diacyl peroxides, and dialkylperoxides.

In some embodiments, an oxidizing agent is present in an aqueous fluid at a concentration in the range of 0.001 M up to saturation as measured at 20° C. In some embodiments, an oxidizing agent is present in an aqueous fluid at a concentration in a range of 0.1 M to 1.0 M. In some embodiments, an oxidizing agent is present in an aqueous fluid at a concentration in a range of 0.2 M to 1.0 M. In some embodiments, an oxidizing agent is present in an aqueous fluid at a concentration in a range of 0.3 M to 1.0 M. In some embodiments, an oxidizing agent is present in an aqueous fluid at a concentration in a range of 0.4 M to 1.0 M. In some embodiments, an oxidizing agent is present in an aqueous fluid at a concentration in a range of 0.5 M to 1.0 M. In some embodiments, an oxidizing agent is present in an aqueous fluid at a concentration in a range of 0.6 M to 1.0 M. In some embodiments, an oxidizing agent is present in an aqueous fluid at a concentration in a range of 0.7 M to 1.0 M. In some embodiments, an oxidizing agent is present in an aqueous fluid at a concentration in a range of 0.8 M to 1.0 M. In some embodiments, an oxidizing agent is present in an aqueous fluid at a concentration in a range of 0.9 M to 1.0 M. In some embodiments, an oxidizing agent is present in an aqueous fluid at a concentration in a range of 0.2 M to 0.9 M. In some embodiments, an oxidizing agent is present in an aqueous fluid at a concentration in a range of 0.3 M to 0.8 M. In some embodiments, an oxidizing agent is present in an aqueous fluid at a concentration in a range of 0.4 M to 0.7 M. In some embodiments, an oxidizing agent is present in an aqueous fluid at a concentration in a range of 0.5 M to 0.6 M. In some embodiments, an oxidizing agent is present in an aqueous fluid at a concentration in a range of 0.1 M to 10.0 M. In some embodiments, an oxidizing agent is present in an aqueous fluid at a concentration in a range of 0.5 M to 10.0 M. In some embodiments, an oxidizing agent is present in an aqueous fluid at a concentration in a range of 1.0 M to 10.0 M. In some embodiments, an oxidizing agent is present in an aqueous fluid at a concentration in a range of 1.5 M to 10. M. In some embodiments, an oxidizing agent is present in an aqueous fluid at a concentration in a range of 2.0 M to 10.0 M. In some embodiments, an oxidizing agent is present in an aqueous fluid at a concentration in a range of 2.5 M to 9.5 M. In some embodiments, an oxidizing agent is present in an aqueous fluid at a concentration in a range of 3.0 M to 9.0 M. In some embodiments, an oxidizing agent is present in an aqueous fluid at a concentration in a range of 3.5 M to 8.5 M. In some embodiments, an oxidizing agent is present in an aqueous fluid at a concentration in a range of 4.0 M to 8.5 M. In some embodiments, an oxidizing agent is present in an aqueous fluid at a concentration in a range of 4.5 M to 8.5 M. In some embodiments, an oxidizing agent is present in an aqueous fluid at a concentration in a range of 5.0 M to 8.5 M. In some embodiments, an oxidizing agent is present in an aqueous fluid at a concentration in a range of 5.5 M to 8.5 M. In some embodiments, an oxidizing agent is present in an aqueous fluid at a concentration in a range of 6.0 M to 8.5 M. In some embodiments, an oxidizing agent is present in an aqueous fluid at a concentration in a range of 6.5 M to 8.5 M. In some embodiments, an oxidizing agent is present in an aqueous fluid at a concentration in a range of 7.0 M to 8.0 M.

In some embodiments, an oxidizing agent is or comprises a bromate salt such as sodium bromate and is present in an aqueous fluid at a concentration in a range of 0.001 M to 2.4 M. In some embodiments, an oxidizing agent comprises sodium bromate and is present in an aqueous fluid at a concentration in a range of 0.01 M to 2.4 M. In some embodiments, an oxidizing agent comprises sodium bromate and is present in an aqueous fluid at a concentration in a range of 0.01 M to 2.2 M. In some embodiments, an oxidizing agent comprises sodium bromate and is present in an aqueous fluid at a concentration in a range of 0.01 M to 2.0 M. In some embodiments, an oxidizing agent comprises sodium bromate and is present in an aqueous fluid at a concentration in a range of 0.01 M to 1.8 M. In some embodiments, an oxidizing agent comprises sodium bromate and is present in an aqueous fluid at a concentration in a range of 0.01 M to 1.6 M. In some embodiments, an oxidizing agent comprises sodium bromate and is present in an aqueous fluid at a concentration in a range of 0.01 M to 1.4 M. In some embodiments, an oxidizing agent comprises sodium bromate and is present in an aqueous fluid at a concentration in a range of 0.01 M to 1.2 M. In some embodiments, an oxidizing agent comprises sodium bromate and is present in an aqueous fluid at a concentration in a range of 0.01 M to 1.0 M. In some embodiments, an oxidizing agent comprises sodium bromate and is present in an aqueous fluid at a concentration in a range of 0.01 M to 0.8 M. In some embodiments, an oxidizing agent comprises sodium bromate and is present in an aqueous fluid at a concentration in a range of 0.01 M to 0.6 M, or 0.01 M to 0.4 M. In some embodiments, an oxidizing agent comprises sodium bromate and is present in an aqueous fluid at a concentration in a range of 0.01 M to 0.2 M. In some embodiments, an oxidizing agent comprises sodium bromate and is present in an aqueous fluid at a concentration in a range of 0.01 M to 0.1 M. In some embodiments, an oxidizing agent comprises sodium bromate and is present in an aqueous fluid at a concentration in a range of 0.01 M to 0.09 M. In some embodiments, an oxidizing agent comprises sodium bromate and is present in an aqueous fluid at a concentration in a range of 0.02 M to 0.09 M. In some embodiments, an oxidizing agent comprises sodium bromate and is present in an aqueous fluid at a concentration in a range of 0.03 M to 0.09 M. In some embodiments, an oxidizing agent comprises sodium bromate and is present in an aqueous fluid at a concentration in a range of 0.04 M to 0.09 M. In some embodiments, an oxidizing agent comprises sodium bromate and is present in an aqueous fluid at a concentration in a range of 0.05 M to 0.09 M. In some embodiments, an oxidizing agent comprises sodium bromate and is present in an aqueous fluid at a concentration in a range of 0.06 M to 0.08 M. In some embodiments, an oxidizing agent is or comprises sodium bromate and is present in an aqueous fluid at a concentration in a range of 0.1 M to 0.5 M. In some embodiments, an oxidizing agent is or comprises sodium bromate and is present in an aqueous fluid at a concentration in a range of 0.1 M to 0.4 M. In some embodiments, an oxidizing agent is or comprises sodium bromate and is present in an aqueous fluid at a concentration in a range of 0.1 M to 0.2 M. In some embodiments, an oxidizing agent is or comprises sodium bromate and is present in an aqueous fluid at a concentration in a range of 0.3 M to 0.4 M. In some embodiments, an oxidizing agent is or comprises sodium bromate and is present in an aqueous fluid at a concentration in a range of 0.15 M to 0.25 M. In some embodiments, sodium bromate is present in an aqueous fluid at a concentration in a range of 0.1 M to 1.0 M. In some embodiments, sodium bromate is present in an aqueous fluid at a concentration in a range of 0.2 M to 1.0 M. In some embodiments, sodium bromate is present in an aqueous fluid at a concentration in a range of 0.3 M to 1.0 M. In some embodiments, sodium bromate is present in an aqueous fluid at a concentration in a range of 0.4 M to 1.0 M. In some embodiments, sodium bromate is present in an aqueous fluid at a concentration in a range of 0.5 M to 1.0 M. In some embodiments, sodium bromate is present in an aqueous fluid at a concentration in a range of 0.6 M to 1.0 M. In some embodiments, sodium bromate is present in an aqueous fluid at a concentration in a range of 0.7 M to 1.0 M. In some embodiments, sodium bromate is present in an aqueous fluid at a concentration in a range of 0.8 M to 1.0 M. In some embodiments, sodium bromate is present in an aqueous fluid at a concentration in a range of 0.9 M to 1.0 M. In some embodiments, sodium bromate is present in an aqueous fluid at a concentration in a range of 0.2 M to 0.9 M. In some embodiments, sodium bromate is present in an aqueous fluid at a concentration in a range of 0.3 M to 0.8 M. In some embodiments, sodium bromate is present in an aqueous fluid at a concentration in a range of 0.4 M to 0.7 M. In some embodiments, sodium bromate is present in an aqueous fluid at a concentration in a range of 0.5 M to 0.6 M. In some embodiments, sodium bromate is present in an aqueous fluid at a concentration in a range of 0.1 M to 10.0 M. In some embodiments, sodium bromate is present in an aqueous fluid at a concentration in a range of 0.5 M to 10.0 M. In some embodiments, sodium bromate is present in an aqueous fluid at a concentration in a range of 1.0 M to 10.0 M. In some embodiments, sodium bromate is present in an aqueous fluid at a concentration in a range of 1.5 M to 10. M. In some embodiments, sodium bromate is present in an aqueous fluid at a concentration in a range of 2.0 M to 10.0 M. In some embodiments, sodium bromate is present in an aqueous fluid at a concentration in a range of 2.5 M to 9.5 M. In some embodiments, sodium bromate is present in an aqueous fluid at a concentration in a range of 3.0 M to 9.0 M. In some embodiments, sodium bromate is present in an aqueous fluid at a concentration in a range of 3.5 M to 8.5 M. In some embodiments, sodium bromate is present in an aqueous fluid at a concentration in a range of 4.0 M to 8.5 M. In some embodiments, sodium bromate is present in an aqueous fluid at a concentration in a range of 4.5 M to 8.5 M. In some embodiments, sodium bromate is present in an aqueous fluid at a concentration in a range of 5.0 M to 8.5 M. In some embodiments, sodium bromate is present in an aqueous fluid at a concentration in a range of 5.5 M to 8.5 M. In some embodiments, sodium bromate is present in an aqueous fluid at a concentration in a range of 6.0 M to 8.5 M. In some embodiments, sodium bromate is present in an aqueous fluid at a concentration in a range of 6.5 M to 8.5 M. In some embodiments, sodium bromate is present in an aqueous fluid at a concentration in a range of 7.0 M to 8.0 M.

In some embodiments, an oxidizing agent can be encapsulated according to known methods. For example, in some embodiments, an oxidizing agent is encapsulated by one or more polymers, emulsions, or oils. In some embodiments, an oxidizing agent is encapsulated by a polymer. In some embodiments, an oxidizing agent is encapsulated by a hydrated polymer. In some embodiments, a hydrated polymer is guar, chitosan, or polyvinyl alcohol. In some embodiments, an oxidizing agent is encapsulated by a binder. In some embodiments, a binder is carboxymethyl cellulose or xanthan. It is understood that heat of formation, presence of acid, or presence of water may each or in collectively erode or degrade encapsulation materials provided herein, thereby releasing reactants (i.e., an oxidizing agent).

Surfactants

The present disclosure encompasses the insight that inclusion of certain surfactants can increase induction time (i.e., reduce reaction rate) between an ammonium salt and an oxidizing agent when generating an acid. As described generally herein, surfactants are a class of anionic surfactants comprising a hydrophilic head group and a hydrophobic tail group. In some embodiments, a surfactant is a sulfonate-based surfactant, a phosphonate-based surfactant, a carboxylate-based surfactant, or a combination thereof. In some embodiments, a surfactant is a sulfonate-based surfactant. In some embodiments, a surfactant is a phosphonate-based surfactant. In some embodiments, a surfactant is a carboxylate-based surfactant. In some embodiments, a surfactant is a combination of a sulfonate-based surfactant and a phosphonate-based surfactant.

In some embodiments, a hydrophobic tail group is or comprises a multifunctional repeating unit selected from aliphatic, heteroaliphatic, aryl, and combinations thereof. In some embodiments, the number of repeating units can vary, for example, from 1 to 30. In some embodiments, a hydrophobic tail group is linear. In some embodiments, a hydrophobic tail group is branched.

In some embodiments, a hydrophobic tail group is aliphatic (e.g. a multifunctional aliphatic). In some embodiments, a hydrophobic tail group is multifunctional $C_{1-12}$ aliphatic, wherein a $C_{1-12}$ aliphatic group is selected from $C_{1-12}$ alkyl, $C_{2-12}$ alkenyl, $C_{2-12}$ alkynyl, and combinations thereof. In some embodiments, a hydrophobic tail group is multifunctional $C_{1-8}$ alkyl. In some embodiments, a hydrophobic tail group is multifunctional $C_{1-6}$ alkyl. In some embodiments, a hydrophobic tail group is multifunctional $C_{1-4}$ alkyl. In some embodiments a hydrophobic tail group is bifunctional $C_{1-2}$ alkyl. In some embodiments, a hydrophobic tail group is methylene. In some embodiments, a hydrophobic tail group is ethylene. In some embodiments, a hydrophobic tail group is propylene. In some embodiments, a hydrophobic tail group is butylene. In some embodiments, a hydrophobic tail group is multifunctional $C_{2-10}$ alkenyl. In some embodiments, a hydrophobic tail group is multifunctional $C_{2-6}$ alkenyl. In some embodiments, a hydrophobic tail group is multifunctional $C_{2-10}$ alkynyl. In some embodiments, a hydrophobic tail group is multifunctional $C_{2-6}$ alkynyl. In some embodiments, an aliphatic group is substituted. Exemplary substituents on an aliphatic group include halogen, —OR, —OC(O)R, —OCO$_2$R, —OC(O)N(R)$_2$, —OCN, —OSi(R)$_3$, —CO$_2$R, —C(O)N(R)$_2$, —C(N)N(R)$_2$, —CN, —N(R)$_2$, —NRC(O)R, —NRCO$_2$R, —NRC(O)N(R)$_2$, —NRC(N)R, —NRC(N)N(R)$_2$, —NO$_2$, —NROR, —SR, or —Si(R)$_3$, wherein R at each occurrence is independently hydrogen, $C_{1-6}$ aliphatic, or $C_{1-6}$ heteroaliphatic. In some embodiments, a hydrophobic tail group comprises multifunctional heteroalkyl. In some embodiments, a hydrophobic tail group comprises a bifunctional group —(CH$_2$)$_z$—O—(CH$_2$)$_z$—, wherein each z is independently from 0 to 12. In some embodiments, a hydrophobic tail group comprises a bifunctional group —(CH$_2$)$_z$—NH—(CH$_2$)$_z$—, wherein each z is independently from 0 to 12. In some embodiments, a hydrophobic tail group comprises a bifunctional group —(CH$_2$)$_z$—O—(CH$_2$)$_z$—NH—(CH$_2$)$_z$—, wherein each z is independently from 0 to 12.

In some embodiments, a hydrophobic tail group comprises a multifunctional aryl group. In some embodiments, a hydrophobic tail group comprises a bifunctional phenyl group. In some embodiments, a hydrophobic tail group comprises a multifunctional aryl group linked to a multifunctional aliphatic group. In some such embodiments, a hydrophobic tail group comprises an alternating pattern of an aryl group and an aliphatic group. For example, in some embodiments, a hydrophobic tail group comprises a group selected from an alkylbenzene, an alkyl group, and combinations thereof.

In some embodiments, a surfactant is a sulfonate-based surfactant. In some embodiments, a sulfonate-based surfactant is selected from, alkyl sulfonates, aryl sulfonates, alkaryl sulfonates, petroleum sulfonates, and the like. In some embodiments, a sulfonate-based surfactant is selected from perfluorobutanesulfonate, perfluoroctanesulfonate, dodecylbenzene sulfonate, and trifluoromethanesulfonate. In some embodiments, a sulfonate-based surfactant is or is derived from

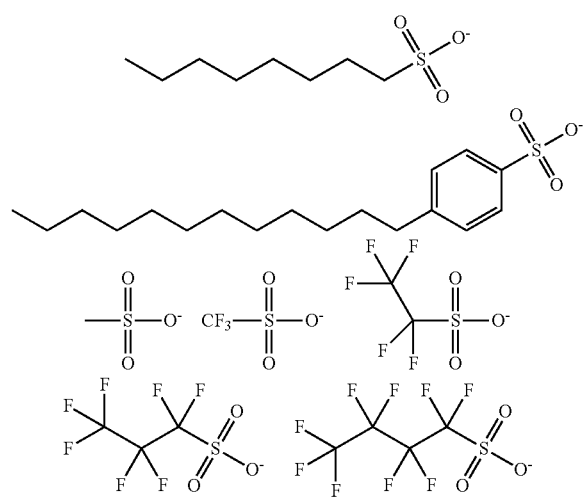

salts of the alkali metal, alkaline earth metal, other metals or tetraalkylammonium cations.

In some embodiments, a sulfonate-based surfactant comprises a petroleum sulfonate. Suitable petroleum sulfonates may be natural or synthetic derivatives. Natural petroleum sulfonates are defined as those manufactured by sulfonation of crude oil, crude distillates, or any portion of crude distillates in which hydrocarbons present are not substantially different from their state in crude oil. Synthetic sulfonates are derived most commonly from sulfonation of olefinic polymers or alkyl aromatic hydrocarbons.

In some embodiments, a surfactant is a phosphonate-based surfactant. In some embodiments, a phosphonate-based surfactant is selected from n-decylphosphonic acid, n-dodecylphosphonic acid, n-hexadecylphosphonic acid, n-hexylphosphonic acid, n-octadecylphonsphonic acid, n-octylphosphonic acid, n-tetradecylphosphonic acid, and combinations thereof.

In some embodiments, a method (or composition) is as described here, where functionality of a surfactant prolongs generation of acid. In some embodiments, a surfactant is combined with suitable inorganic or organic acids as a means of tailoring a profile for acid generation.

In some embodiments, a surfactant is combined with a suitable inorganic acid. In some embodiments, an inorganic acid is selected from the group consisting of hydrochloric acid, chloric acid, hydrobromic acid, sulfuric acid, nitric acid, perchloric acid, hydroiodic acid, phosphoric acid, and combinations thereof.

In some embodiments, a surfactant salt is combined with an organic acid. In some embodiments, an organic acid is an acid comprising one or more carboxylic acids. In some embodiments, an organic acid is a polycarboxylic acid. For example, in some embodiments, an organic acid is an acid comprising at least two, three, four, five, six, seven, eight, nine, or ten carboxylic acids. Suitable organic acids include alkanesulfonic acids, arylsulfonic acids, alkyl carboxylic acids, aryl carboxylic acids, and combinations thereof. In some embodiments, an organic acid is selected from the group consisting of formic acid, acetic acid, methanesulfonic acid, p-toluenesulfonic acid, lactic acid, glycolic acid, malonic acid, fumaric acid, citric acid, tartaric acid, chloroacetic acid, dichloroacetic acid, trichloroacetic acid, fluoroacetic acid, difluoroacetic acid, trifluoroacetic acid, glutamic acid diacetic acid, methylglycindiacetic acid, 4,5-imidazoledicarboxylic acid, and combinations thereof. Various other organic acids are well known to those of skill in the chemical arts and are contemplated for use in compositions and methods described in the present application.

In some embodiments, a surfactant is combined with a suitable acid-generating compound as a means of tailoring a profile for acid generation. In some embodiments, an acid-generating compound releases acid by hydrolysis. In some embodiments, an acid-generating compound comprises one or more ester and/or formate that are water soluble or partially water soluble. Exemplary acid-generating compounds include lactic acid derivatives, methyl lactate, ethyl lactate, propyl lactate, butyl lactate, and the like. In some embodiments, an acid-generating compound is a formate ester. Suitable formate esters include ethylene glycol monoformate, ethylene glycol diformate, diethylene glycol diformate, glyceryl monoformate, glyceryl diformate, glyceryl triformate, triethylene glycol diformate, and formate esters of pentaerythritol. In some embodiments, an acid-generating compound is ethylene glycol monoformate or diethylene glycol diformate. In some embodiments, an acid-generating compound is a nitrile-containing compound. In some embodiments, an acid-generating compound is an ester, for instance, polyesters of glycerol including tripropionin (a triester of propionic acid and glycerol), trilactin, and esters of acetic acid and glycerol such as monoacetin, diacetin, and triacetin. In some embodiments, an acid-generating compound comprises an ester, aliphatic polyester, poly(lactide), poly(glycolide), poly(ε-caprolactone), poly(hydroxybutyrate), poly(anhydride), aliphatic polycarbonate, poly(amino acid), polyphosphazene, or copolymers thereof, or derivatives and combinations thereof.

In some embodiments, an acid-generating compound comprises an ester, aliphatic polyester, orthoester, poly(orthoester), poly(lactide), poly(glycolide), poly(ε-caprolactone), poly(hydroxybutyrate), poly(anhydride), ethylene glycol monoformate, ethylene glycol diformate, diethylene glycol diformate, glyceryl monoformate, glyceryl diformate, glyceryl triformate, triethylene glycol diformate, formate esters of pentaerythritol, or combinations thereof.

Methods for the Controlled Delivery of Acid

In some embodiments, the present application describes methods for controlled delivery of acid to a site, comprising contacting the site with one or more aqueous fluids comprising an ammonium salt, an oxidizing agent, and a surfactant, characterized in that the acid is generated at the site at a rate that is less than the rate of acid generation when a surfactant is absent.

In some embodiments, a method is as described here, where a step of contacting comprises introducing an aqueous solution of an ammonium salt, an aqueous solution of an oxidizing agent, and an aqueous solution of a surfactant into a formation via the same tubing (for example, the same coiled tubing) and allowing an aqueous fluid to form in situ within the tubing, within a formation or within an area around a wellbore.

In some embodiments, a method is as described here, where a step of contacting comprises introducing an aqueous solution of an ammonium salt, an aqueous solution of an oxidizing agent, and an aqueous solution of a surfactant into a formation in separate stages (optionally via the same or different tubings, for example the same or different coiled tubings) and allowing an aqueous fluid to form in situ within a formation. In some embodiments, an aqueous solution of an ammonium salt is introduced into a formation before introduction of an oxidizing agent. In some embodiments, an aqueous solution of an oxidizing agent is introduced into a formation before introduction of an ammonium salt. In some embodiments, an aqueous solution of a surfactant is introduced with an aqueous solution of an ammonium salt. In some embodiments, an aqueous solution of a surfactant is introduced with an aqueous solution of an oxidizing agent.

In some embodiments, an ammonium salt and/or an oxidizing agent is introduced into a formation via an emulsified and/or encapsulated form, thereby providing an increased delay of acid generation. Encapsulated oxidizing agent are commercially available and known to those of ordinary skill in the art. For example, encapsulated oxidizing agents include sodium persulfate, potassium persulfate, sodium bromate, potassium bromate, and the like.

In some embodiments, an ammonium salt and/or oxidizing agent is encapsulated in a polymer shell, an oil phase, or other type of shell structure that provides a controlled release of reagent. In some embodiments, a polymer shell comprises one or more monomers that have undergone polymerization such that a polymer shell forms and encapsulates a reagent. In some embodiments, a polymer is an acrylate or methacrylate-based polymer. For example, in some embodiments, a monomer is selected from the group consisting of diurethane dimethacrylate, ethoxylated trimethyolpropane triacrylate, bisphenol-A glycerolate dimethacrylate, 1,6-hexanediol diacrylate, urethane acrylate oligomer, 2-hydroxylethylacrylate, and 2,2-bis[4-(2-acryloxyethoxyphenyl]propane. In some embodiments, an ammonium salt and/or oxidizing agent is encapsulated, for example, by placing a reagent as an internal phase of an emulsion (so-called "emulsified oxidizer slug") and then either causing or allowing the emulsion to break down by temperature exposure or by using a suitable breaker, for example a reagent capable of breaking an emulsion, that places active component(s) in contact with a formation, where reaction is desired. In some embodiments, an emulsion system is a water in oil emulsion, where a water phase contains an ammonium salt and/or oxidizer, and an oil phase is a continuous phase selected from diesel, solvent, crude oil or mineral oil. In some embodiments, a solvent is an organic solvent. In some embodiments, a solvent is xylene. In some embodiments, a water phase contains both an ammonium salt and an oxidizer, where a reaction generating acid takes place at a desired temperature and the emulsion will break at a desired location inside a pore space, not in a wellbore. In some embodiments, an oxidizer is encapsulated in an internal water phase, while an ammonium salt is contained in an external oil phase of an emulsion, where a reaction generating acid takes place at a desired temperature and the emulsion will break at a desired location inside a pore space, not in a wellbore. In some embodiments, an ammonium salt is encapsulated in an internal water phase, while an oxidizer is contained in an external oil phase of an emulsion, where a reaction generating acid takes place at a desired temperature and the emulsion will break at a desired location inside a pore space, not in a wellbore. In some embodiments, an ammonium salt is introduced in emulsified form, while an oxidizer is introduced without emulsification. In alternative embodiments, an oxidizer is introduced in emulsified form, while an ammonium salt is introduced without emulsification. In some embodiments, an ammonium salt is introduced in encapsulated form, while an oxidizer is introduced without encapsulation. In alternative embodiments, an oxidizer is introduced in encapsulated form, while an ammonium salt is introduced without encapsulation.

In some embodiments, an emulsion breaks down when exposed to outside stimuli, such as an elevated temperature, turbulent flow, etc., as described herein. In some embodiments, an emulsion breaker is introduced into to a formation. Suitable emulsion breakers are, in some embodiments, of a chemical and/or electrolytic nature. In some embodiments, an emulsion is formed with degradable surfactants or switchable surfactants. For example, in some embodiments, a surfactant used for emulsification is a degradable surfactant or switchable surfactant, which on heating will break and lose its emulsifying property, thus releasing a reagent(s). In some embodiments, once downhole, surfactants under heat will hydrolyze and break an emulsion, thus releasing a reagent(s). Additionally, in some embodiments, an emulsion is broken by being destabilized by heat and shear forces generated during introduction into a formation. In some embodiments, a formation and its components help in breaking an emulsion, for example, oil from a formation causes an emulsion to break.

In some embodiments, an ammonium salt and/or an oxidizing agent is encapsulated with a self-degradable coating. Without wishing to be bound by any particular theory, it is believed that such a coating provides a temporary barrier between ammonium salt and oxidizing agent to delay release of acid. Moreover, it is believed that composition of a degradable coating and thickness of such coating affords a particular time delay in releasing a reactant downhole. For example, availability of an encapsulated ammonium salt and/or oxidizing agent is dependent on rate of removal of degradable coating of an encapsulated reagent. In some embodiments, a thicker degradable coating degrades over a longer period of time. In some embodiments, susceptibility to an erosive environment is used to tune degradation time for a material. For example, a degradable material may be selected based on water solubility and/or susceptibility to heat degradation. Suitable encapsulation materials for a degradable coating of an ammonium salt and/or oxidizing agent include hydrated polymers, such as guar, chitosan, and polyvinyl alcohol or binders, such as carboxymethyl cellulose or xanthan. In certain embodiments, carboxymethyl cellulose or xanthan is used to encapsulate an ammonium salt.

In some embodiments, the extent of application of a degradable coating affects availability of an ammonium salt and/or oxidizing agent to react. In some embodiments, 30 wt % to 100 wt % of an ammonium salt and/or oxidizing agent is encapsulated. In some embodiments, 50 wt % to 90 wt % of an ammonium salt and/or oxidizing agent is encapsulated.

In some embodiments, 40 wt % to 95 wt % of an ammonium salt and/or oxidizing agent is encapsulated. In some embodiments, 30 wt % to 60 wt % of an ammonium salt and/or oxidizing agent is encapsulated. In some embodiments, 60 wt % to 85 wt % of an ammonium salt and/or oxidizing agent is encapsulated.

Without wishing to be bound by any particular theory, it is believed that, in some embodiments, for a greater percentage an ammonium salt and/or oxidizing agent encapsulated, a longer delay in acid generation is observed. For example, when 100 wt % of an ammonium salt and/or oxidizing agent is encapsulated, reaction delay is controlled by erosion rate of a degradable coating and commensurate rate of availability of such ammonium salt and/or oxidizing agent. When, for example, only 30 wt % of an ammonium salt and/or oxidizing agent is encapsulated, 70 wt % of said reactant is available for reaction. It will be appreciated by one of skill in the art that in some embodiments, adjusting parameters of a degradable coating provides for tunability of a treatment fluid based on specific reservoir conditions.

Temperature

In some embodiments, controlled delivery of an acid using compositions and methods described here comprises controlling a temperature at which an acid is generated. For instance, in some embodiments, a composition described here is designed (that is, components are selected) such that it requires a certain desired threshold temperature in order for an oxidizing agent to react with an ammonium salt to generate acid. In some embodiments, an ammonium salt and an oxidizing agent react to produce acid at a temperature equal to or greater than 65° C. In some embodiments, an ammonium salt and an oxidizing agent react to produce acid at a temperature equal to or greater than 65° C. in the absence of an accelerant and/or highly concentrated conditions. For instance, in some embodiments, compositions described here react at a temperature of at least 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 210° C., 220° C., 230° C., 240° C., 250° C., 260° C., 270° C., 280° C., 290° C., or 300° C. in order to generate acid. For instance, in some embodiments, compositions described here react at a temperature of at least 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C., in order to generate acid. In some embodiments, compositions described here react at a threshold temperature in a range of 65° C. to 300° C. in order to generate acid. In some embodiments, compositions described here react at a threshold temperature in a range of 65° C. to 200° C. in order to generate acid. In some embodiments, compositions described here react at a threshold temperature in a range of 65° C. to 190° C. in order to generate acid. In some embodiments, compositions described here react at a threshold temperature in a range of 65° C. to 180° C. in order to generate acid. In some embodiments, compositions described here react at a threshold temperature in a range of 65° C. to 170° C. in order to generate acid. In some embodiments, compositions described here react at a threshold temperature in a range of 65° C. to 160° C. in order to generate acid. In some embodiments, compositions described here react at a threshold temperature in a range of 65° C. to 150° C. in order to generate acid. In some embodiments, compositions described here react at a threshold temperature in a range of 65° C. to 140° C. in order to generate acid. In some embodiments, compositions described here react at a threshold temperature in a range of 65° C. to 130° C. in order to generate acid. In some embodiments, compositions described here react at a threshold temperature in a range of 65° C. to 120° C. in order to generate acid. In some embodiments, compositions described here react at a threshold temperature in a range of 100° C. to 300° C. in order to generate acid. In some embodiments, compositions described here react at a threshold temperature in a range of 120° C. to 300° C. in order to generate acid. In some embodiments, compositions described here react at a threshold temperature in a range of 150° C. to 300° C. in order to generate acid. In some embodiments, compositions described here react at a threshold temperature in a range of 200° C. to 300° C. in order to generate acid. In some embodiments, compositions described here react at a threshold temperature in a range of 100° C. to 250° C. in order to generate acid. In some embodiments, compositions described here react at a threshold temperature in a range of 150° C. to 250° C. in order to generate acid.

In some embodiments, a threshold temperature is reduced, for instance by adding an amount of acid to a composition. In some embodiments, a threshold temperature is reduced, for example, by adding an accelerant to a composition. In some embodiments, an accelerant is a metal salt. Exemplary metal salts include, for example, $FeCl_2$, $CuI$, $TiCl_2$, and the like.

In some embodiments, heat for generation of an acid using compositions and methods described here occurs naturally at a location at which acid generation is desired. For instance, in some embodiments, heat comes from a rock formation, such as a carbonate, sandstone, or shale formation. It will be appreciated that an actual threshold temperatures for generation of acid within a formation (which is under elevated pressure, for example, where pressure is greater than 1 atmosphere) may be less than those recited here.

Other Parameters

In some embodiments, a method (or composition) is as described here, where pH of an aqueous fluid at a temperature of less than 65° C., is greater than 5. In some such embodiments, pH is greater than 6. In some such embodiments, pH is greater than 7.

In some embodiments, a method (or composition) is as described here, where an ammonium salt and an oxidizing agent react at a temperature as described above, and a pressure of 1 atmosphere. In some embodiments, a method (or composition) is as described here, where an ammonium salt and an oxidizing agent react at a temperature as described above, and a pressure greater than 1 atmosphere. In some embodiments, a method (or composition) is as described here, where an ammonium salt and an oxidizing agent react at a temperature as described above, and a pressure of at least 100 atmosphere. In some embodiments, a method (or composition) is as described here, where an ammonium salt and an oxidizing agent react at a temperature as described above, and a pressure of at least 200 atmosphere. In some embodiments, a method (or composition) is as described here, where an ammonium salt and an oxidizing agent react at a temperature as described above, and a pressure of at least 300 atmosphere. In some embodiments, a method (or composition) is as described here, where an ammonium salt and an oxidizing agent react at a temperature as described above, and a pressure of at least 400 atmosphere. In some embodiments, a method (or composition) is as described here, where an ammonium salt and an oxidizing agent react at a temperature as described above, and a pressure in a range of 1 to 100 atmosphere. In some embodiments, a method (or composition) is as described here, where an ammonium salt and an oxidizing agent react at a temperature as described above, and a pressure in a range of 100 to 500 atmosphere. In some embodiments, a method (or composition) is as described here, where an ammonium salt and an oxidizing agent react at a temperature as described above, and a pressure in a range of 100 to 350 atmosphere. In some embodiments, a method (or composition) is as described here, where an ammonium salt and an oxidizing agent react at a temperature as described above, and a pressure in a range of 100 to 250 atmosphere.

In some embodiments, the present application describes methods for in situ acid stimulation of a rock-based formation that contains a hydrocarbon reservoir, where a formation comprises carbonates. In some embodiments, the present application describes methods for in situ acid stimulation of a rock-based formation that contains a hydrocarbon reservoir, where a formation comprises sandstone. In some embodiments, the present application describes methods for in situ acid stimulation of a rock-based formation that contains a hydrocarbon reservoir, where a formation comprises shale.

In some embodiments, a method (or composition) is as described here, where an aqueous fluid does not contain a free tertiary amine salt or a compound which reacts to form a free tertiary amine salt in situ. For instance, in some such embodiments, an aqueous fluid does not comprise a trialkylamine such as trimethylamine, triethylamine, tri-n-propylamine, tri-n-butyl-amine, dimethyldodecylamine, or dimethyltetradodecylamine.

Exemplary Embodiments

Embodiment 1. A method for delivering an acid to a site, the method comprising steps of contacting the site with one or more aqueous fluids comprising an ammonium salt, an oxidizing agent, and a surfactant, characterized in that the acid is generated at the site at a rate that is less than the rate of acid generation when the surfactant is absent.

Embodiment 2. The method of Embodiment 1, wherein the surfactant is selected from a phosphonate-based, sulfonate-based, and combinations thereof.

Embodiment 3. The method of Embodiment 2, wherein the surfactant is a sulfonate-based surfactant.

Embodiment 4. The method of Embodiment 3, wherein one of the one or more aqueous fluids comprises the ammonium salt, the oxidizing agent, and the sulfonate-based surfactant.

Embodiment 5. The method of Embodiment 3, wherein the ammonium salt, the oxidizing agent, and the sulfonate-based surfactant are delivered to the site via separate aqueous fluids.

Embodiment 6. The method of any one of Embodiments 1-5, wherein the ammonium salt is or comprises ammonium fluoride, ammonium chloride, ammonium bromide, ammonium iodide, or mixtures thereof.

Embodiment 7. The method of any one of Embodiments 1-6, wherein the concentration of the ammonium salt in the one or more aqueous fluids is in a range from about 0.001 M to saturation, when measured at 20° C.

Embodiment 8. The method of any one of Embodiments 1-7, wherein the oxidizing agent is selected from a peroxide, a persulfate salt, a permanganate salt, a bromate salt, a perbromate salt, a hypochlorite salt, a chlorite salt, a chlorate salt, a perchlorate salt, a iodate salt, a periodate salt, and combinations thereof.

Embodiment 9. The method of Embodiment 6, wherein the oxidizing agent is selected from sodium persulfate, potassium persulfate, sodium bromate, potassium bromate, and combinations thereof.

Embodiment 10. The method of Embodiment 9, wherein the oxidizing agent is sodium bromate.

Embodiment 11. The method of any one of Embodiments 1-10, wherein the concentration of the oxidizing agent in the one or more aqueous fluids is from 0.001 M to saturation, when measured at 20° C.

Embodiment 12. The method of any one of Embodiments 1-11, wherein the concentration of the oxidizing agent in the one or more aqueous fluids is from 0.1 M to 0.5 M.

13. The method of any one of Embodiments 1-12, wherein the oxidizing agent is encapsulated.

Embodiment 14. The method of Embodiment 13, wherein the oxidizing agent is encapsulated by a polymer.

Embodiment 15. The method of any one of Embodiments 3-14, wherein the sulfonate-based surfactant is selected from perfluorobutanesulfonate, perfluoroctanesulfonate, dodecylbenzene sulfonate, and trifluoromethanesulfonate.

Embodiment 16. The method of any one of Embodiments 3-14, wherein the sulfonate-based surfactant is or is derived from fluorinated and non-fluorinated alkylsulfonic acids whose salts may be used to delay the reaction between oxidizer and ammonium salt:

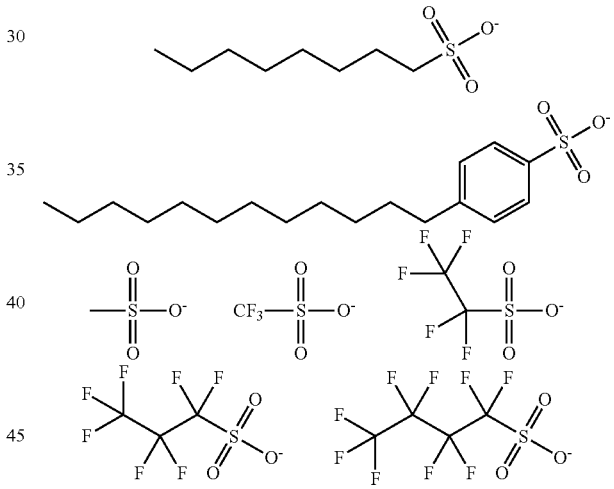

Embodiment 17. The method of any one of Embodiments 3-14, wherein the sulfonate-based surfactant is or comprises a petroleum sulfonate.

Embodiment 18. The method of any one of Embodiments 1-17, wherein the ammonium salt and the oxidizing agent only generate the acid at a temperature that is greater than or equal to 65° C.

Embodiment 19. The method of any one of Embodiments 1-18, where the ammonium salt and the oxidizing agent react at a temperature in a range of 65° C. to 200° C. to produce acid.

Embodiment 20. The method of any one of Embodiments 1-17, wherein the ammonium salt and the oxidizing agent only generate the acid at a pressure that is greater than 1 atm.

Embodiment 21. The method of any one of Embodiments 1-20, wherein the molar ratio of the surfactant to the ammonium salt or the oxidizing agent is 1:1 or less.

Embodiment 22. The method of any one of Embodiments 1-21, wherein site is a rock-based formation.

Embodiment 23. The method of any one of Embodiments 1-22, wherein the rock-based formation is a carbonate, sandstone, or shale-based formation.

Embodiment 24. The method of Embodiment 23, wherein the rock formation is a sandstone formation.

Embodiment 25. The method of Embodiment 23, wherein the rock formation is a carbonate formation.

Embodiment 26. The method of Embodiment 25, wherein the carbonate formation comprises calcite, dolomite or combinations thereof.

Embodiment 27. The method of Embodiment 23, wherein the rock formation is a shale formation.

Embodiment 28. The method of any one of Embodiments 1-27, wherein the oxidizing agent is present in an amount in excess of the ammonium salt.

Embodiment 29. The method of Embodiment 28, wherein the amount of oxidizing agent in excess of the ammonium salt reacts with organic matter in the subterranean formation.

Embodiment 30. The method of any one of Embodiments 1-29, wherein the one or more aqueous fluids each comprise one of the ammonium salt, the oxidizing agent, or the surfactant, and are delivered to the site sequentially.

Embodiment 31. In a method of generating acid at a site comprising contacting the site with one or more aqueous fluids comprising an ammonium salt and an oxidizing agent, the improvement that comprises contacting the site with one or more aqueous fluids comprising a surfactant.

Embodiment 32. The method of Embodiment 31, wherein the surfactant is selected from a phosphonate-based, sulfonate-based, carboxylate-based, and combinations thereof.

Embodiment 33. The method of Embodiment 32, wherein the surfactant is a sulfonate-based surfactant.

Embodiment 34. The method of any one of Embodiments 1-33, wherein the one or more aqueous fluids are delivered by one or more of coiled tubing or bullheading.

Embodiment 35. The method of any one of Embodiments 1-34, wherein the one or more aqueous fluids do not contain a free tertiary amine salt or a compound which reacts to form a free tertiary amine salt in situ.

EXEMPLIFICATION

The present teachings including descriptions provided in the Examples that are not intended to limit the scope of any claim. Unless specifically presented in the past tense, inclusion in the Examples is not intended to imply that the experiments were actually performed. The following non-limiting examples are provided to further illustrate the present teachings. Those of skill in the art, in light of the present disclosure, will appreciate that many changes can be made in the specific embodiments that are disclosed and still obtain a like or similar result without departing from the spirit and scope of the present teachings.

A series of experiments were conducted to evaluate whether induction time of a reaction of ammonium chloride and sodium bromate would be impacted by addition of a small quantity of surfactant. In each test, 10 mmol of ammonium chloride and 5 mmol of sodium bromate were dissolved in 25 mL of water in a 120 mL Ace Glass pressure tube. Surfactants were added in the concentration range of 0.001 M to 0.2 M. Each tube was then capped and heated at 150° C. in a recirculating oil bath until the induction time was reached as evidenced by the change from colorless to orange, indicative of bromine gas formation. Significant lengthening in induction time was observed in all cases. The reference induction time for the surfactant-less reaction is 4 minutes.

| Surfactant | Concentration | Induction Time | Delay Factor |
|---|---|---|---|
| sodium trifluoromethanesulfonate | 0.01M | 36 minutes | 9× |
| sodium dodecylbenzenesulfonate | 0.01M | 1 hour, 6 minutes | 16.5× |
| sodium perfluorobutanesulfonate | 0.01M | 22 minutes | 5.5× |
| sodium-1-octanesulfonate | 0.01M | 24 minutes | 6× |

The invention claimed is:

1. A method for delivering an acid to a site within a rock formation, the method comprising:
   introducing one or more aqueous fluids to the formation thereby contacting the site with the one or more aqueous fluids comprising an ammonium salt, an oxidizing agent, and a surfactant; and
   generating an acid at the site at a rate that is less than the rate of acid generation when the surfactant is absent;
   wherein the surfactant is selected from the group consisting of a phosphonate-based surfactant, a sulfonate-based surfactant, and combinations thereof, and
   wherein the sulfonate-based surfactant is or is derived from one or more selected from methanesulfonate, trifluoromethanesulfonate, pentafluoroethanesulfonate, heptafluoropropanesulfonate, perfluorobutanesulfonate, octanesulfonate, dodecanesulfonate, dodecylbenzene sulfonate, or petroleum sulfonate,
   wherein the surfactant is configured to delay a reaction between the oxidizing agent and the ammonium salt such that acid generation is delayed,
   wherein a molar ratio of the surfactant to the ammonium salt or to the oxidizing agent is 1:1 or less.

2. The method of claim 1, wherein the ammonium salt is or comprises ammonium fluoride, ammonium chloride, ammonium bromide, ammonium iodide, or mixtures thereof.

3. The method of claim 1, wherein a concentration of the ammonium salt in the one or more aqueous fluids is in a range from about 0.001 M to saturation, when measured at 20° C.

4. The method of claim 1, wherein the oxidizing agent is selected from the group consisting of a peroxide, a persulfate salt, a permanganate salt, a bromate salt, a perbromate salt, a hypochlorite salt, a chlorite salt, a chlorate salt, a perchlorate salt, an iodate salt, a periodate salt, and combinations thereof.

5. The method of claim 2, wherein the oxidizing agent is selected from the group consisting of sodium persulfate, potassium persulfate, sodium bromate, potassium bromate, and combinations thereof.

6. The method of claim 5, wherein the oxidizing agent is sodium bromate.

7. The method of claim 1, wherein a concentration of the oxidizing agent in the one or more aqueous fluids is from 0.1 M to 0.5 M.

8. The method of claim 1, wherein the sulfonate-based surfactant is selected from the group consisting of perfluorobutanesulfonate, perfluoroctanesulfonate, dodecylbenzene sulfonate, trifluoromethanesulfonate, and combinations thereof.

9. The method of claim 1, wherein the sulfonate-based surfactant is or comprises a petroleum sulfonate.

10. The method of claim 1, wherein the ammonium salt and the oxidizing agent only generate the acid at a temperature in a range of 65° C. to 200° C.

11. The method of claim 1, wherein site is a rock-based formation.

12. The method of claim 1, wherein the rock-based formation is a carbonate, sandstone, or shale-based formation.

13. The method of claim 12, wherein the carbonate formation comprises calcite, dolomite or combinations thereof.

14. The method of claim 1, wherein the oxidizing agent is present in an amount in excess of the ammonium salt.

15. The method of claim 14, wherein the amount of oxidizing agent in excess of the ammonium salt reacts with organic matter in a subterranean formation.

16. The method of claim 1, wherein the introducing the one or more aqueous fluids to the formation further comprises:
   introducing sequentially separate aqueous fluids to the formation, wherein the separate aqueous fluids comprise at least one of the ammonium salt, the oxidizing agent, or the surfactant.

17. The method of claim 1, wherein an induction time for acid generation is increased by 20 minutes or more as compared to an induction time when the surfactant is absent.

* * * * *